(12) United States Patent
Morris et al.

(10) Patent No.: US 10,891,243 B2
(45) Date of Patent: *Jan. 12, 2021

(54) MEMORY BUS MR REGISTER PROGRAMMING PROCESS

(71) Applicant: Intel Corporation, Santa Clara, CA (US)

(72) Inventors: Tonia G. Morris, Wendell, NC (US); John V. Lovelace, Driftwood, TX (US); John R. Goles, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/529,700

(22) Filed: Aug. 1, 2019

(65) Prior Publication Data
US 2020/0065266 A1 Feb. 27, 2020

Related U.S. Application Data

(63) Continuation of application No. 15/718,346, filed on Sep. 28, 2017, now Pat. No. 10,380,043.

(51) Int. Cl.
*G06F 13/36* (2006.01)
*G06F 13/16* (2006.01)
*G06F 1/10* (2006.01)

(52) U.S. Cl.
CPC ............ *G06F 13/1663* (2013.01); *G06F 1/10* (2013.01); *G06F 13/1689* (2013.01)

(58) Field of Classification Search
CPC ..... G06F 13/1663; G06F 13/1689; G06F 1/10
See application file for complete search history.

(56) References Cited

U.S. PATENT DOCUMENTS

| 7,610,423 | B2 * | 10/2009 | Gower | G06F 13/4243 |
| | | | | 365/201 |
| 9,037,774 | B2 * | 5/2015 | Solomon | G11C 5/04 |
| | | | | 711/5 |
| 2002/0004922 | A1 * | 1/2002 | Manning | G11C 7/1072 |
| | | | | 714/720 |
| 2011/0153925 | A1 | 6/2011 | Bains et al. | |
| 2013/0094271 | A1 * | 4/2013 | Schuetz | G11C 5/06 |
| | | | | 365/63 |
| 2013/0346684 | A1 | 12/2013 | Bains | |
| 2014/0372816 | A1 * | 12/2014 | Bains | G06F 11/10 |
| | | | | 714/723 |
| 2015/0153966 | A1 * | 6/2015 | Lee | G06F 13/4234 |
| | | | | 711/147 |
| 2018/0025171 | A1 * | 1/2018 | Shan | G06F 21/6218 |
| | | | | 726/18 |
| 2018/0090185 | A1 * | 3/2018 | Hossain | G11C 7/1072 |
| 2019/0042498 | A1 | 2/2019 | Morris et al. | |

* cited by examiner

*Primary Examiner* — Jing-Yih Shyu
(74) *Attorney, Agent, or Firm* — Compass IP Law PC

(57) ABSTRACT

A method performed by a memory chip is described. The method includes receiving an activated chip select signal. The method also includes receiving, with the chip select signal being activated, a command code on a command/address (CA) bus that identifies a next portion of an identifier for the memory chip. The method also includes receiving the next portion of the identifier on a portion of the memory chip's data inputs. The method also includes repeating the receiving of the activated chip select signal, the command code and the next portion until the entire identifier has been received and storing the entire identifier in a register.

21 Claims, 8 Drawing Sheets

US 10,891,243 B2

MEMORY BUS MR REGISTER PROGRAMMING PROCESS

This application is a continuation of and claims the benefit of U.S. patent application Ser. No. 15/718,346, entitled, "MEMORY BUS MR REGISTER PROGRAMMING PROCESS", filed Sep. 28, 2017, and issued as U.S. Pat. No. 10,380,043 on Aug. 13, 2019 which is incorporated by reference in its entirety.

FIELD OF INVENTION

The field of invention pertains generally to computing systems, and, more specifically, to an improved memory bus MR register programming process.

BACKGROUND

The performance of a computing system is heavily dependent on the computing system's system memory (also referred to as main memory). As such, system designers are highly motivated to improve the performance of system memory. Improving the performance of system memory can include reducing the time spent or increasing the efficacy of the training and configuration of the system memory that transpires, e.g., during system boot up.

FIGURES

Figure 1:
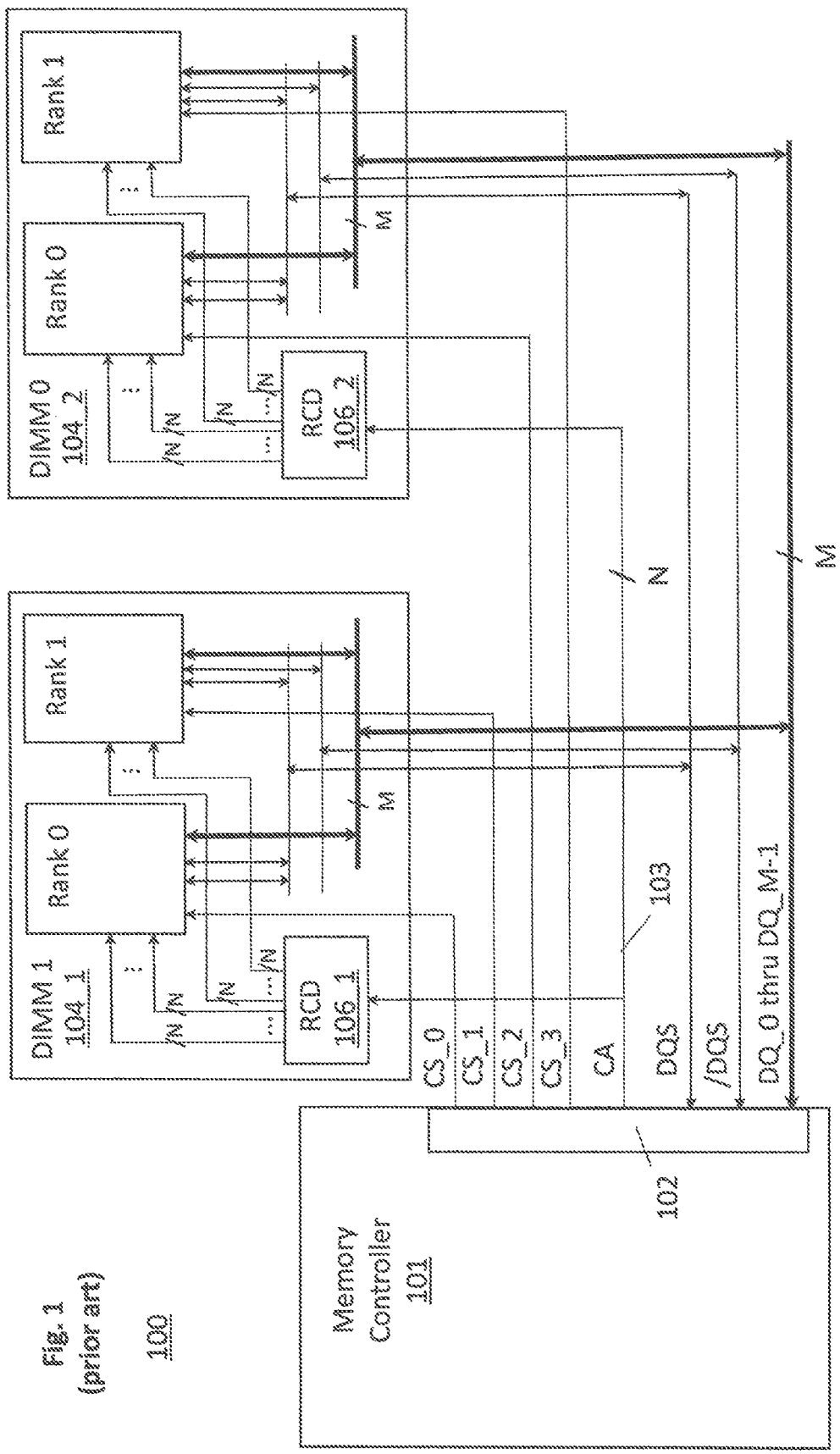
Figure 2:
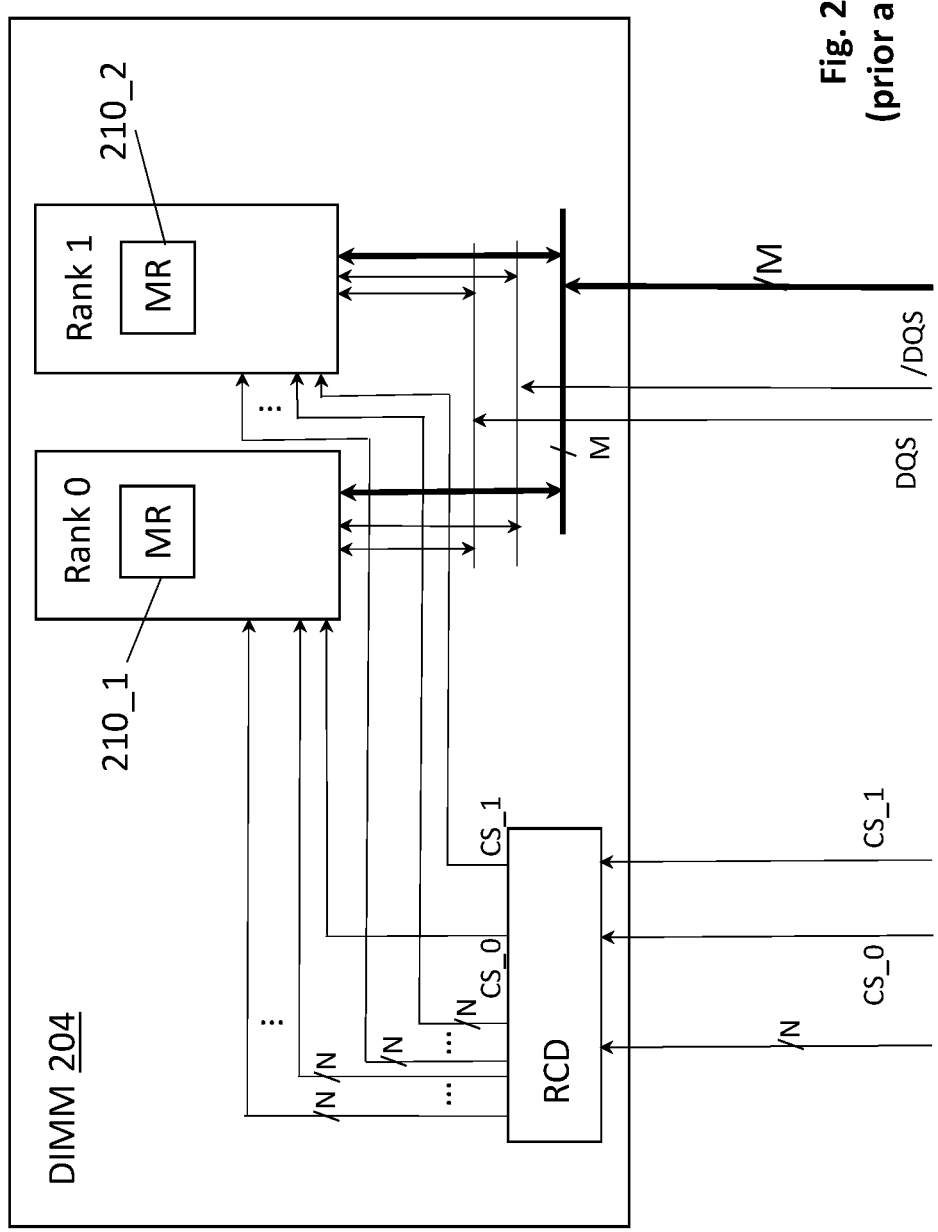
Figure 3:
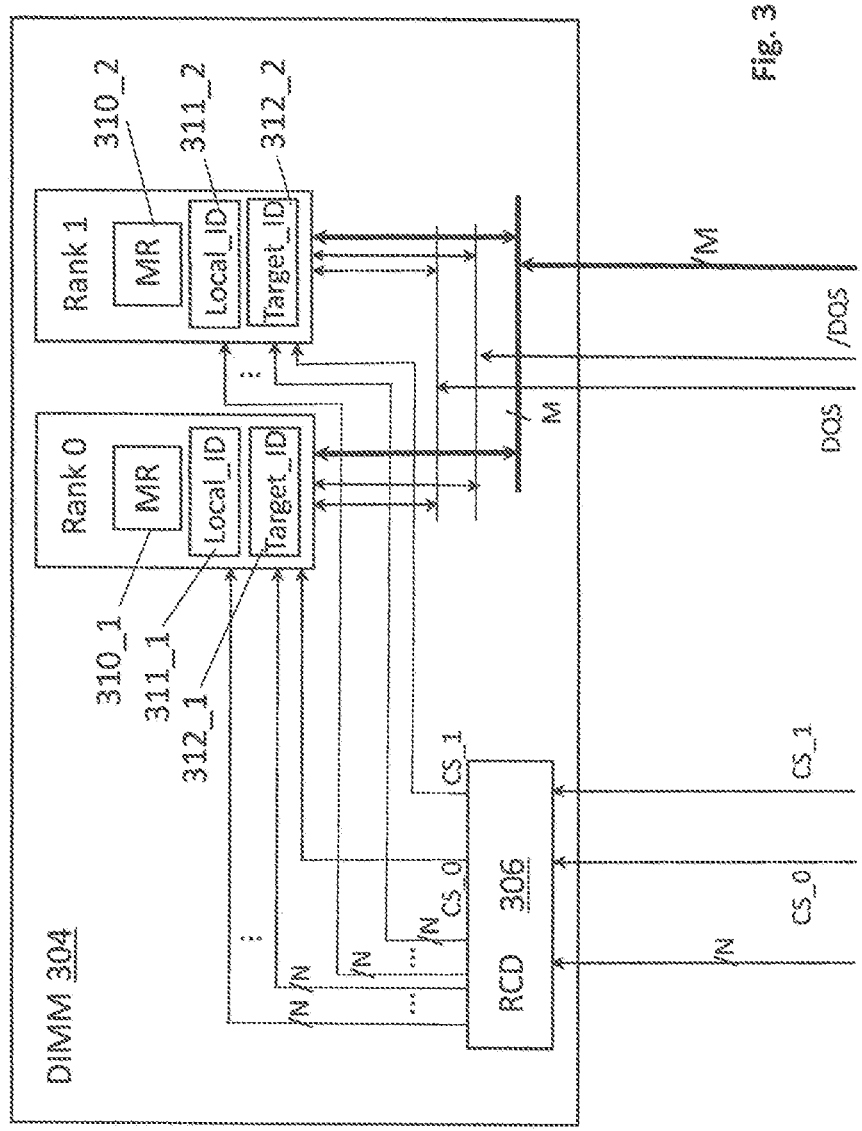
Figure 4:
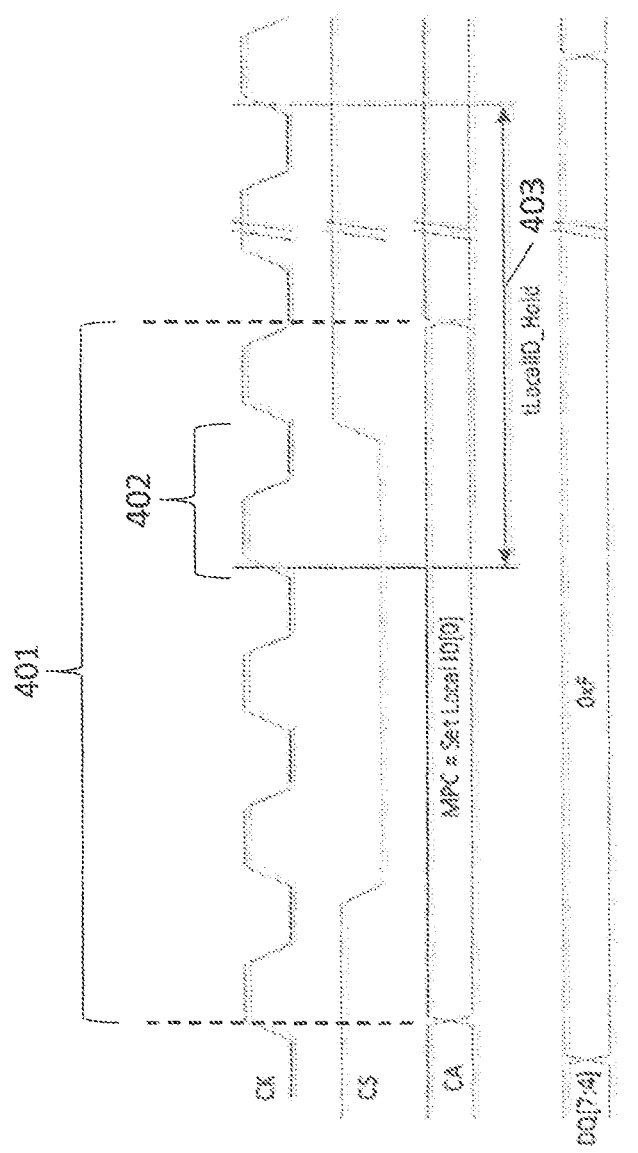
Figure 5:
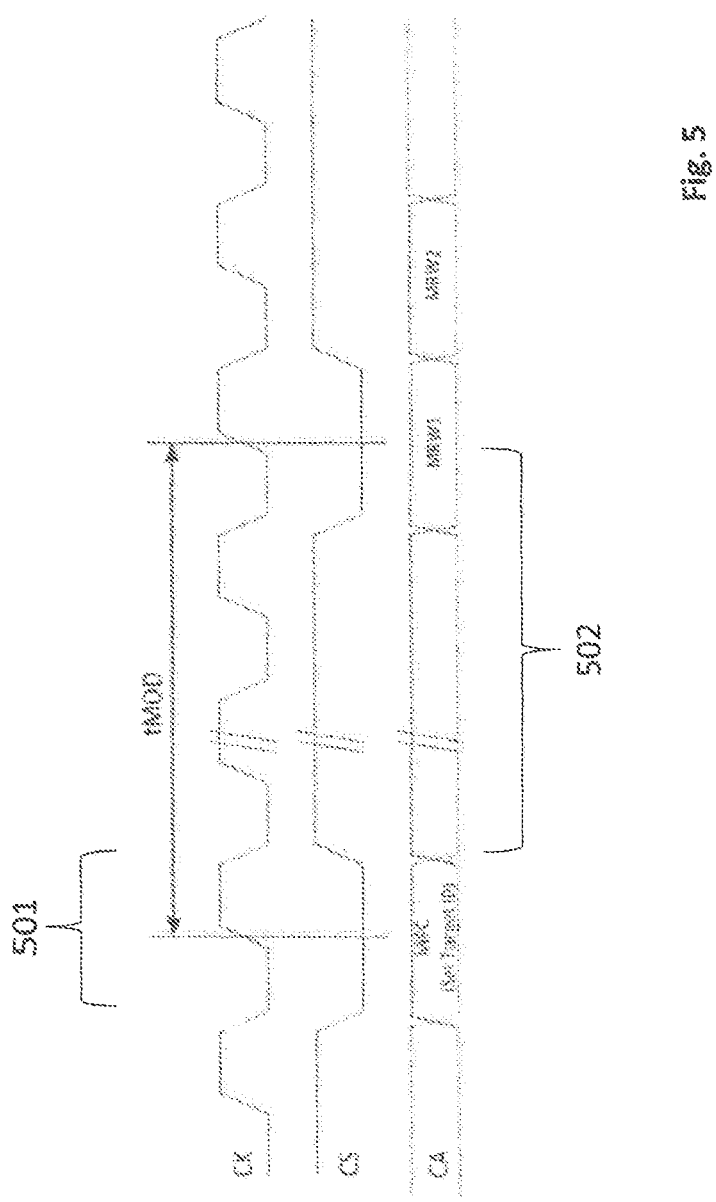
Figure 6:
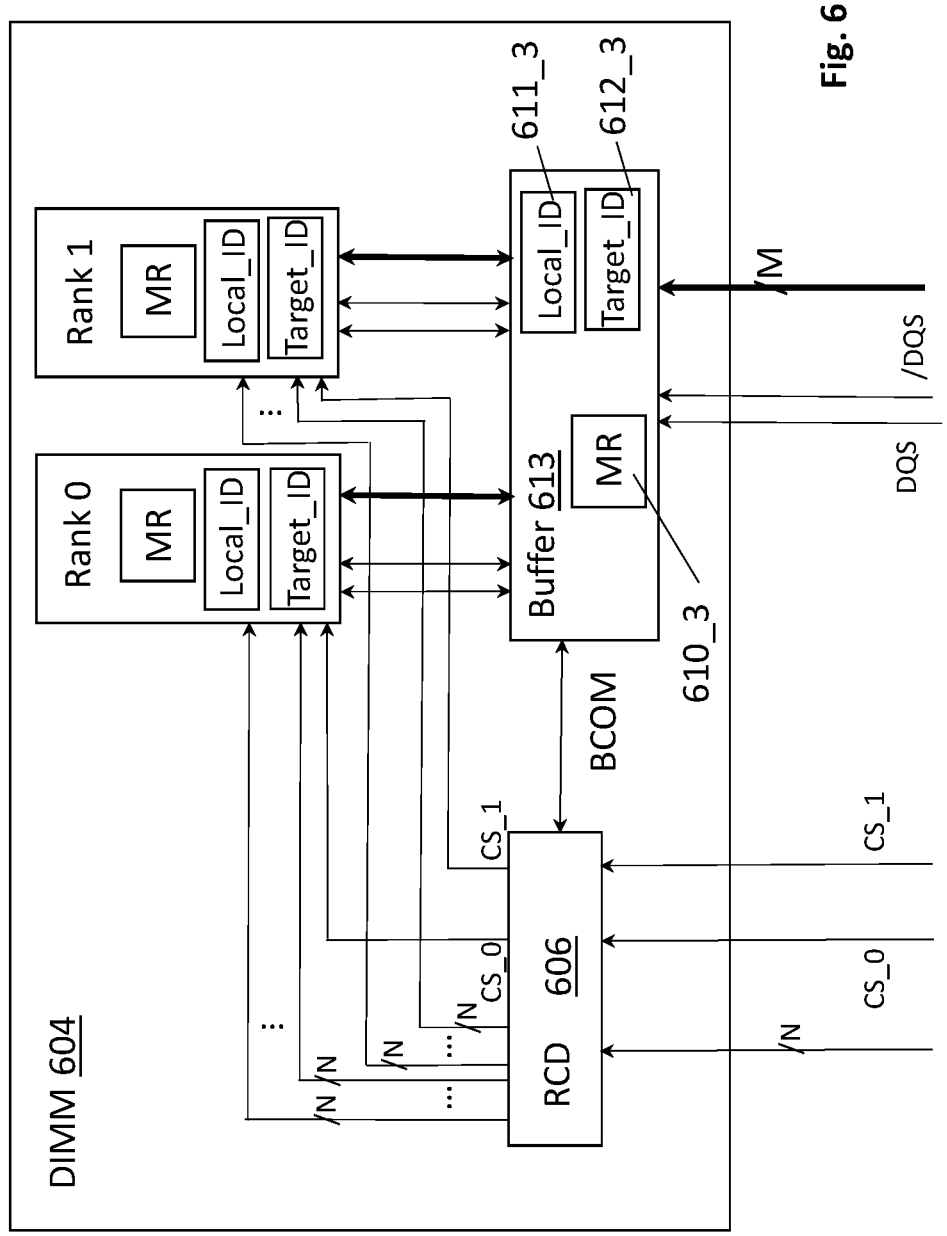
Figure 7:
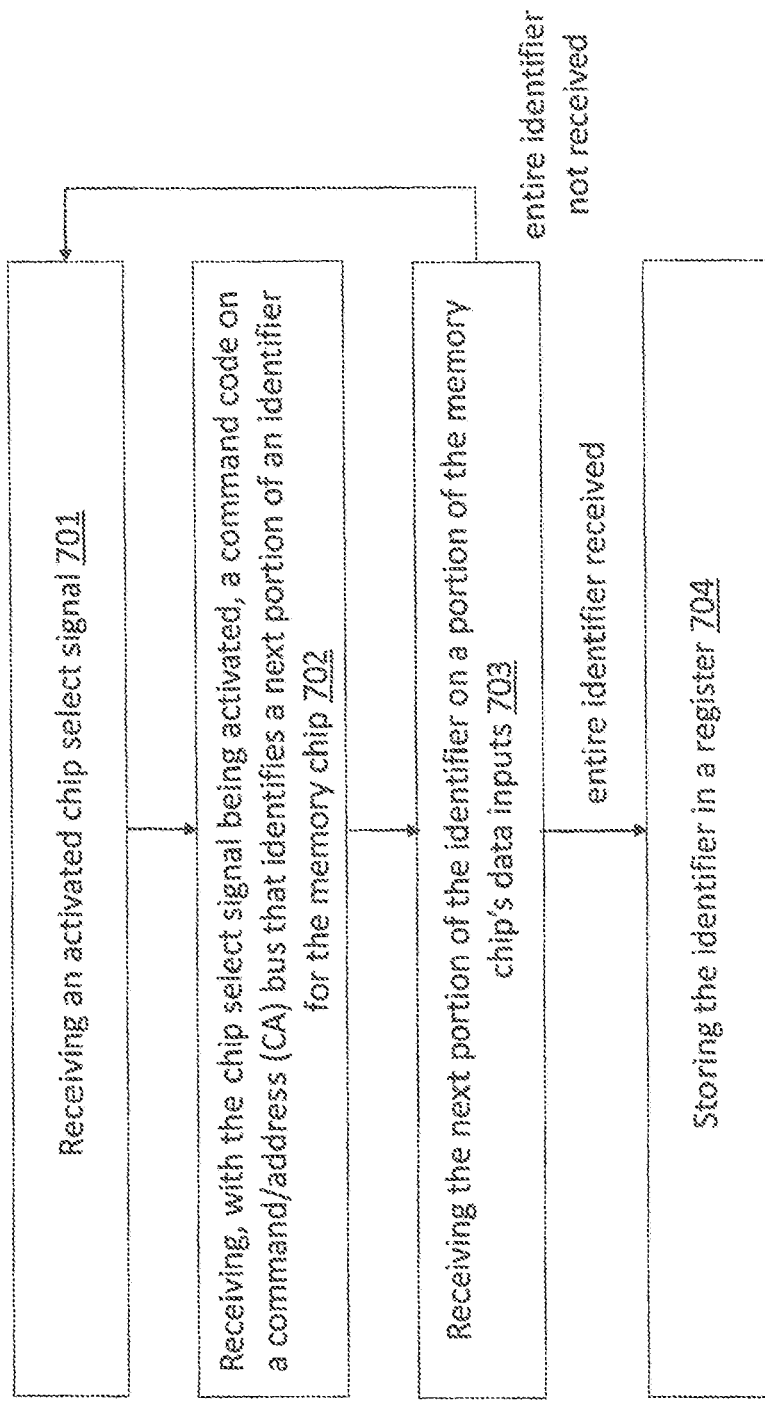
Figure 8:
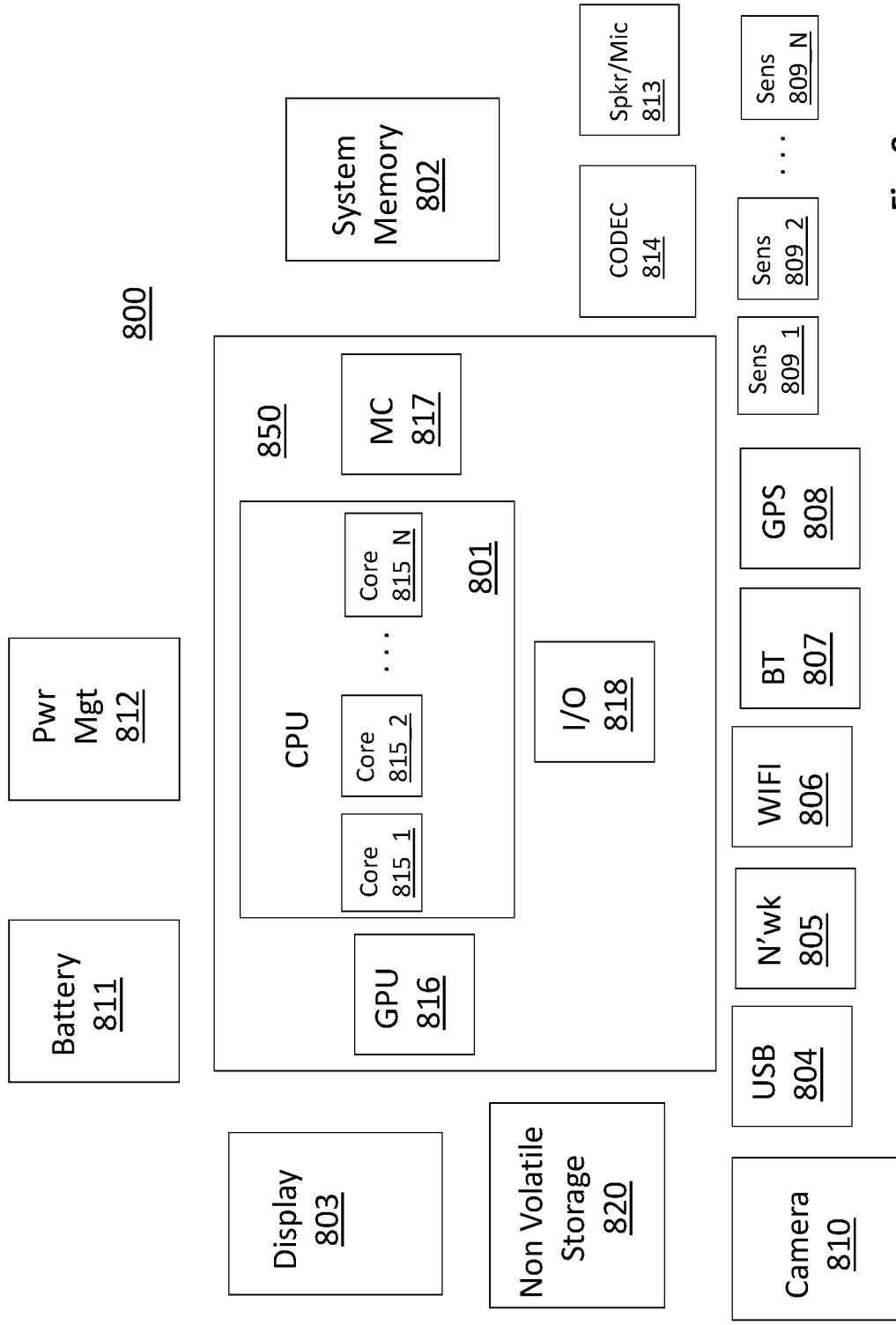

A better understanding of the present invention can be obtained from the following detailed description in conjunction with the following drawings, in which:

FIG. 1 shows a prior art memory system;
FIG. 2 shows a prior art DIMM;
FIG. 3 shows an improved DIMM;
FIG. 4 shows a first MR register programming protocol;
FIG. 5 shows a second MR register programming protocol;
FIG. 6 shows another improved DIMM;
FIG. 7 shows a method;
FIG. 8 shows a computing system.

DETAILED DESCRIPTION

FIG. 1 shows a schematic diagram of a prior art system memory implementation 100. As observed in FIG. 1, the system memory implementation includes a memory controller 101 on the host side. The memory controller 101 includes a double data rate (DDR) memory bus interface 102 that is coupled to the wiring of a DDR memory bus this is disposed, e.g., on the motherboard of a computing system.

A pair of dual in line memory modules 104_1, 104_2 (DIMMs) are coupled to the memory bus. The memory bus includes N control signal wires that together are referred to as the CA bus 103. The control signals that are carried on the CA bus 103 include, to name a few, a row address strobe signal (RAS), column address strobe signal (CAS), a write enable (WE) signal and a plurality of address (ADDR) signals. The M DQ lines correspond to the data bus of the system memory. As observed in FIG. 1, the control signals 103 are intercepted by a registering clock driver (RCD) circuit 106_1, 106_2 on each of the DIMMs 104_1, 104_2. For ease of illustration, FIG. 1 indicates that the chip select (CS) signals are not intercepted by the RCD circuits of the respective DIMM card that they are directed to. However, in various prior art implementations, the RCD circuits receive and redrive the CS signals of their respective DIMM.

FIG. 2 shows another perspective of a prior art DIMM 204. As observed in FIG. 2, each memory chip includes mode register (MR) space 210_1, 210_2 that is programmed (written to) by the host side, e.g., to program specific configuration parameters into a specific memory chip (e.g., any/all of voltage reference, timing, equalization, termination and drive strength settings). Here, each memory chip often is programmed with unique settings that are different than the settings of other memory chips.

For ease of illustration FIG. 2 suggests there is only one memory chip with MR register space per rank. However, the reader will understand that a rank is traditionally implemented as a set of one or more memory chips that are tied to a same chip select signal. Here, a memory rank of a particular data width is realized by tying the clock and control signals (CA) of the DDR memory bus and the rank specific CS signal to each memory chip of the rank. However, each of the data bus inputs/outputs of the DDR bus are routed to only one of rank's memory chips. By so doing, the data width of a memory rank is the data width of the rank's memory chips multiplied by the number of chips in the rank. As such, for example, a 64 bit data width rank can be constructed from four 16 bit memory chips or eight 8 bit memory chips. Thus, traditionally, each rank is composed of multiple memory chips each having its own dedicated MR register space.

In a common situation, a DDR memory bus is "trained" during system boot up. During training, the system measures certain characteristics of its environment and then programs the various MR registers of the DIMM's memory chips to effectively configure the memory chips to behave optimally or at least reliably within its environment.

A problem with prior art MR programming approaches, however, is that the identity of the target MR space that is being written to is sent over the DQ data bus with tight timing constraints before the DQ signal lines themselves have been fully trained and configured. Because high speed data signals are sent over the less than optimally configured DQ signal lines it is not uncommon for the memory chip that is targeted by the MR write sequence to fail to recognize that its MR space is the target of the MR programming command, and/or, fail to receive the correct value that is to be written into the MR space.

FIG. 3 shows an improved DIMM card in which each of the memory chips on the DIMM contain Local_ID register space 311_1, 311_2 and Target ID register space 312_1, 312_2. As with FIG. 2, for ease of illustration, FIG. 3 only shows one set of registers per rank. However, the reader should understand that in various embodiments there are multiple memory chips per rank and each memory chip in a rank has its own dedicated Local_ID and Target_ID register space. Here, as will be described more fully below, in various embodiments, the Local_ID is a unique identifier for each individual memory chip that is coupled to the memory bus.

As will be described in more detail immediately below, the programming of a unique Local_ID into each memory chip is performed in parallel for an entire bank of memory chips (all chips in a same bank are concurrently programmed with their own respective Local_ID value). After all memory chips have been programmed with their respective Local_ID value, an individual MR register command can be sent to any particular, single memory chip within the memory system.

Also, in various embodiments, the Local_ID is programmed into each memory chip using relaxed timing constraints which ensures that each memory chip will properly receive its customized Local_ID value. However, the parallelized programming of the respective Local_ID for each memory chip in a memory bank compensates for any performance concern associated with the relaxed timing constraints. That is, although the programming sequence consumes a greater number of unit interval (UI) cycles than it might otherwise consume if performed on properly configured signal lines, the concurrent programming of multiple Local_IDs brings the number of Local_IDs that are programmed per unit of time within an acceptable level of performance.

After each memory chip has properly received its Local_ID identification and stored it into its own register space, subsequent MR register write commands (MRWs) will include a Target_ID parameter that identifies the memory chip whose MR register space is being targeted by the MR write command. In an embodiment, memory chips of a same rank will latch the Target_ID into their local Target_ID register space and compare the contents of their Target_ID register space to the contents of their Local_ID register space (memory chips of other ranks will ignore the command because their chip select will not be activated).

Generally, only one memory chip for a particular command will have its Local_ID and Target_ID register values match. The particular memory chip whose Local_ID matches the Target_ID of the newly issued command will understand that its MR register space is being targeted by the command and will execute the command (which typically specifies a particular MR register within the MR register space and, in the case of a write (MRW) command, a value to be programmed into the MR register). Likewise, the other memory chips of the targeted memory chip's rank that latched the Target_ID into their Target_ID MR register space will recognize that their Local_ID does not match the Target_ID of the newly issued command and will therefore ignore the command.

This general operation continues during the bring-up and/or training of the DDR bus (and possibly thereafter) with each new MR register command including an associated Target_ID, the memory chip whose Local_ID matches the Target_ID executing the command, and other memory chips whose Local_ID does not match the Target_ID ignoring the command.

It is pertinent to point out that, in various embodiments, the Local_ID is programmed into each memory chip prior to the issuing by the memory controller of any (or at least many) MR register programming commands that desire to write specific configuration settings into specific memory chips. That is, the infrastructure for successfully programming the DDR bus's MR registers (the programming of a Local_ID into each of the DDR bus's memory chips) should be completed before attempting to program any of the MR registers of the DDR bus's memory chips.

FIG. 4 shows an embodiment of the relaxed timing environment used to program the Local_ID of the memory chips of a same rank. As observed in FIG. 4, the memory chips of the rank whose Local_IDs are to be programmed are specified by activating the specific chip select (CS) of the rank. Here, referring briefly back to FIG. 2, note that a typical DDR bus routes a unique CS signal to each memory rank. As discussed above, the memory chips of a same memory rank are not only coupled to the DDR memory channel's control/address bus (CA) and data bus (DQ) but also a same chip select input.

With the CS signal for a particular memory rank being activated and the other CS signals for the other ranks being deactivated, only the memory chips of the rank with the activated CS signal will react to the programming sequence of FIG. 4. Here, the CA bus is a multi-bit bus where the digital value on the multi-bit bus is viewed by the activated memory chips of the targeted memory rank as a command code (also referred to as a command word). In an embodiment, different kinds of command codes can be presented on the CA bus such as a Multi-Purpose Command (MPC) code or a MR Register Write (MRW) code.

In the particular embodiment of FIG. 4, the particular code on that is presented on the CA bus during timeframe 401 is an MPC code that specifies which particular bit of the Local_ID is to be programmed (conceivably, in other embodiments, an MPW code may be used). For example, an initial MPC code word will specify that the lowest ordered bit of the Local_ID is to be programmed, a following (different) MPC code word will specify that the next lowest ordered bit of the Local_ID is to programmed, etc. In the particular depiction of FIG. 4, the MPC code word is specifying that the lowest ordered bit of the Local_ID ("ID[0]") is to be programmed.

FIG. 4 shows the timing associated with the command for only one MPC word (and therefore shows the timing associated with programming of a single bit of the Local_ID). As such, the timing sequence of FIG. 4 is repeated multiple times (once for each bit of the Local_ID) to fully program a complete Local_ID value. Notably, the MPC code word that specifies which particular bit of the Local_ID is to be programmed is presented on the CA bus for an extended number of clock cycles while the CS signal is active (a logic low). Specifically, as observed in the particular embodiment of FIG. 4, the MPC code word is held on the CA bus for three full clock cycles while the CS signal for the targeted bank is active. Here, keeping the MPC code word on the CA bus for three clock cycles while the CS signal is activated ensures that the memory chips that are associated with the targeted memory rank will correctly interpret the MPC code word and recognize that they are the target of the MPC word (in other embodiments even more than three clock cycles may be consumed).

That is, with the understanding that the various control and data signal lines have not yet been optimized (because their training and MR register setting is not yet complete), the receiving end of the signal lines at the targeted memory chips are apt to observe various disturbances in the signals they receive (e.g., reflections, etc.). By drawing these signals out over multiple clock signals, any such disturbances will eventually recede so that correct interpretation is ensured if the signals are sampled at a later clock cycle. Thus, in the embodiment of FIG. 4, the MPC code word is sampled by the memory chips of the targeted memory rank on the rising edge of the third clock cycle 402 that is observed while the CS signal is low. Again, however, as discussed immediately below, the memory chips of the rank will have their Local_IDs concurrently programmed which compensates for the slower programming sequence.

The ability to concurrently program a unique Local_ID into each memory chip of the targeted rank is a consequence of each memory chip being coupled to its own unique set of data bus lines. That is, for instance, in an embodiment where a 64 bit data bus is implemented with four 16 bit memory chips, the data I/Os of a first memory chip are coupled to data bus signal lines DQ[0] through DQ[15], the data I/Os of a second memory chip are coupled to data bus signal lines DQ[16] through DQ[31], the data I/Os of a third memory chip are coupled to data bus signal lines DQ[32] through DQ[47] and the fourth memory chip are coupled to data bus signal lines DQ[48] through DQ[63].

As such, the Local_ID for the first memory chip can be uniquely set by transferring its value over data bus signal lines DQ[0] through DQ[15], the Local_ID for the second memory chip can be uniquely set by transferring its value over data bus signal lines DQ[16] through DQ[31], the Local_ID for the third memory chip can be uniquely set by transferring its value over data bus signal lines DQ[32] through DQ[47], and the Local_ID for the fourth memory chip can be uniquely set by transferring its value over data bus signal lines DQ[48] through DQ[63].

In a further feature of the Local_ID programming sequence of FIG. 4, recalling that the sequence of FIG. 4 only programs one Local_ID bit at a time, the value of the specific Local_ID bit that is being programmed as specified by the MPC code word is presented on multiple DQ data bus lines that are routed to the receiving memory chip. For ease of illustration, FIG. 4 only shows the DQ lines that are used to program the first memory chip. However, as can be seen from FIG. 4, four DQ signal lines are used to set the single bit being programmed (lines DQ[7] through DQ[4]).

Here, if the specific bit of the Local_ID for the first memory chip is to be programmed to a logical "1", each of DQ lines DQ[7] through DQ[4] will be set to a logic 1, or, if the specific bit is to be programmed to a logical "0", each of DQ lines DQ[7] through DQ[4] will be set to a logic 0. Each of the other memory chips on the rank similarly use a subset of their DQ lines to receive the value of the bit being programmed (e.g., the second memory chip receives the bit value on DQ lines DQ[23] through DQ[20], the third memory chip receives the bit value on DQ lines DQ[39] through DQ[36] and the fourth memory chip receives the bit value on DQ lines DQ[63] through DQ[60]). Again, however, the settings on each subset are unqiue to each memory chip (some can be set to a "1", others a "0" depending on the specific Local_ID that is being programmed into each memory chip).

The receiving memory chips can be confident they have received the correct data bit if they recognize the same value on all four of their DQ lines (if they do not, an error flag can be raised). Alternatively, the receiving memory chips may use a majority voting technique to decide what the received bit value is (e.g., if three of the four DQ lines are interpreted as a "1", the memory device understands that the received value is a "1"). Moreover, as with the MPC code word, multiple clock cycles are reserved for the transfer of the Local_ID bit on the DQ lines with the value finally being sampled on a later clock cycle.

That is, as observed in FIG. 4, the MPC code word is sampled by the memory chips having an activated CS on the rising edge of the third clock cycle 402. From that point forward, another number of clock cycles 403 are executed before the data on the DQ lines is sampled. Again, the extended number of clock cycles ensures correct reception of the transferred data value for essentially the same reasons described above with respect to the MPC code word. Thus, if the number of such cycles is X, 3+X clock cycles are consumed before one bit of the Local_ID into the memory chips of the targeted rank is actually written to.

In other embodiments the Local_ID MPC code word could specify that more than one bit is being programmed and the DQ bus could be designed to articulate these bits. For example, the MPC code word could specify that two, three or four bits (or even more bits) of the Local_ID are being programmed in the current cycle. So doing would reduce the number of cycles consumed to program the Local_ID for each of the memory chips on the activated bank. Correspondingly, more of the DQ lines may be consumed during a single cycle to transfer the multiple bits in the same cycle (e.g., eight DQ lines are consumed per memory chip to transfer two Local_ID bits). Furthermore, the amount of redundancy (number of DQ lines consumed to ensure reliable transfer of information) may be lessened or expanded (from four bits) depending on designer preference and/or performance constraints or objectives. For example, to expand redundancy, all DQ bits of a memory chip could be used to specify the Local_ID bit being programmed. Additionally, the reader should understand the teachings herein are not limited to memory chips of any particular data bus width (e.g., memory chips having a data bus width of 4, 8, 16, 32 or other width can be adapted to store a Local_ID).

In various embodiments, more generally, the Local_ID can be seen as a form of enumeration encoding. Enumeration encodings assign unique IDs to the memory chips of a memory bus and present these unique IDs on the CA bus (e.g., as an MPC code). Other enumeration approaches, however, effectively use the DQ bus to send chip select signals that inform a target memory chip that it is the target of the write activity that will set its ID. In such approaches, the unique ID values are passed over the CA bus rather than the DQ bus. The present approach differs in that the actual chip select signal is used to activate an entire bank of memory chips and the unique ID values (the Local_ID values) are sent over the DQ bus and not the CA bus (to enable concurrent setting of unique ID values across multiple chips).

In still yet other embodiments, the MPC command that specifies a Local_ID is being programmed may include a mask format. That is, viewing the MPC command structure as including an opcode and a mask embedded as, e.g., an immediate operand. The mask is used to indicate that certain bits on the DQ bus are valid while other bits on the DQ bus are not valid. Including mask information in the MPC command allows for some versatility regarding how many Local_ID bits are to be programmed in the current cycle. For example, lower performance noisier environments may choose to only program one Local_ID bit per cycle, while, higher performance cleaner environments may choose to program, e.g., three or four bits per cycle. The mask structure would indicate the specific set of DQ line(s) that carry the bit(s) that are to be programmed in either environment (e.g., one bit is reserved in the mask for each DQ line that is received by the memory chip).

Further still, although the foregoing discussion has emphasized that the Local_ID bits are transferred as traditional data bits on the DQ lines, other more sophisticated embodiments may choose to articulate the Local_ID on the DQ lines as an encoding of some form. For example, a Local_ID could be specified as a thermometer code on the DQ lines (e.g., "1000"=1; "1100"=2="10"; "1110"=3="11", etc.) or spatial code (e.g., having a hamming distance between codes that reduces the likelihood that a particular code is mis-interpreted as another code).

FIG. 5 shows an embodiment of the timing associated with nominal programming of MR register space after the Local_ID information has been successfully programmed into each of the memory chips on the memory bus (e.g., after all memory ranks on the memory bus have had their respective memory chips concurrently programmed). As mentioned above, the programming of MR register space is also referred to as an MR Write or MRW command.

As observed in FIG. 5, the MRW command includes, in a same clock cycle 501: 1) activating the CS of the rank that the memory chip that is to have its MR register space specifically written to is a member of; and, 2) identifying the specific chip that is being written to with its Target_ID embedded in an MPC code word that is presented on the CA bus ("Set Target ID"). The MR register(s) of the targeted memory chip are then written to a specific number of clock cycles later 502.

Here, sequences MRW1, MRW2 of FIG. 5 are MPC code words that specify both the MR register to be written to and the value to be written into the MR register. Depending on implementation, both the targeted MR register and the value to be written into it can be specified in a single clock cycle with a single MPC code word, or, in multiple clock cycles with multiple MPC code words (e.g., with respect to the later, a first MPC code (MRW1) specifies the MR register to be written to and a second MPC code word (MRW2) specifies the value to be written into the MR register). Notably, the MRW sequence does not use the DQ bus whereas other enumeration schemes, as discussed above, use the DQ bus to select target memory chips even during a nominal mode register write. Moreover not using the DQ bus helps ensure reliable transfer for situations (e.g., early boot-up) before the DQ bus has been fully trained.

Here, the memory chips of the rank whose CS signal was activated to write to the specific memory chip being targeted will compare the Target_ID in the first MPC code word to their own internal Local_ID. Commonly, only one of the memory chips will recognize a match between the Target_ID and the Local_ID while the remaining memory chips will not recognize a match. As such, the remaining (non targeted) memory chips will ignore the command while the targeted memory chip which recognized the match will understand that it is the target of the command.

Those of ordinary skill will recognize that, generally, MPC and MRW are two different command encodings. In DDR5 this distinction is made because MPC is a single cycle command and can extend the timings, whereas MRW is a 2 UI (2 cycle) command encoding.

In various embodiments, the number of clock cycles 502 between the MRW command and the first valid MRW UI (MRW1) can vary from embodiment. For example, in one approach two (or more) different MPC codes are reserved for an MRW operation where the different codes correspond to different numbers of clock cycles 502. That is, for instance, a first code may correspond to X number of clock cycles 502, a second code may correspond to Y number of clock cycles 502 and a third code may correspond to Z number of clock cycles 502 where X<Y<Z. Here, the maximum number of clock cycles 502 (Z with the third code) may be used if training is not started or not complete for the targeted memory chip, while, the least number of clock cycles 502 (X with the first code) may be used when training for the targeted memory chip is complete. As such, the system can vary the number of clock cycles per MRW operation depending on the confidence in the ability of the underlying hardware to perform (with more clock cycles being consumed if there is less confidence (e.g., before or during training) and less cycles being consumed if there is more confidence (e.g., after training is complete)).

FIG. 6 shows another type of DIMM 604 that includes a buffer chip 613 to buffer input and/or output data that is sent to/from the DIMM. A buffer chip 613 can improve overall system performance because the memory controller can write to the DIMM's memory chips at a rate that is greater than the rate at which the memory chips can physically be written to. As observed in FIG. 6, the buffer chip 613 also includes MR register space 610_3, Local_ID register space 611_3 and Target_ID register space 612_3. The Local_ID and Target_ID register space 611_3, 612_3 is used so that MR register space 610_3 can be programmed as described at length above for the DIMM card's memory chips. For ease of illustration FIG. 6 shows only one buffer chip 613 for both ranks. In various embodiments there may be one buffer chip per rank with each buffer chip having its own dedicated MR register space and corresponding Local_ID and Target_ID.

Note that the DIMM cards 304, 604 of both FIGS. 3 and 6 include a Registering Clock Driver (RCD) circuit 306, 606. Notably, the RCD circuits 306, 606 intercept the clock, CS and CA bus signals but do not intercept the DQ signals. As such, a DIMM's RCD circuit 306, 606 could potentially send MRW commands to the memory chips on the DIMM 304, 604 using the MRW command approach of FIG. 5. That is, because the RCD circuit 306, 606 does not receive nor drive DQ signals and because the MRW command sequence of FIG. 5 does not use DQ signals, an RCD circuit could be designed to send MRW commands to a memory chip or a buffer chip beyond just redriving such commands as sent from the memory controller.

Here, in various embodiments, the RCD circuit 306, 606 of a DIMM could be designed to include controller circuitry (not shown in FIG. 3 or FIG. 6 for illustrative ease) that sends the Local_ID programming commands to the ranks and/or buffer on a same DIMM that the RCD circuit is disposed on. By so doing, the RCD circuit is offloading this responsibility from the memory controller which, e.g., can quicken bring-up time by allowing the memory controller to, e.g., start DQ training sooner in the bring-up process and carry forward such training with less interruption.

Here, as is known in the art, there are various forms of DIMMs. For example, RDIMMs (Registered DIMMs) and LRDIMMs (Load Reduced DIMMs) include an RCD chip and therefore could be designed to integrate controller intelligence/capability into the RCD chip that independently writes Local_ID values into the DIMM card's memory banks and/or buffers. An RDIMM typically does not include a buffer and therefore is better represented by FIG. 3 than by FIG. 6 (because the DIMM 604 of FIG. 6 includes a buffer 613). Other types of DIMMs such as SODIMMs (Small Outline DIMMs) and UDIMMs (Unregistered DIMM) could also be designed to accept Local_ID information and MRW information as described above.

In various embodiments a special MPC Target_ID code word is used to specify more than one memory chip (e.g., all memory chips on the DDR bus). Here, the MR register handling logic circuitry of the memory chips and buffer chips (if any) are not only designed to perform the Local_ID and Target_ID protocol behavior described at length above but are also designed to recognize the one or more special Target_ID codes that specify the targeting of more than one memory chip. In one embodiment there is a Global Target MPC command that targets all memory chips on the DDR bus (or all memory chips and buffer chips on the DDR bus). In an alternative or combined approach the Global Target MPC command includes a mask structure having a bit reserved for each memory chip and buffer chip on the bus. If the bit for a particular memory chip or buffer is set in the mask, the corresponding chip will execute the command. The chips whose bits are not set in the mask structure will ignore the command.

In various implementations, the DDR bus that utilizes the MR register programming protocols described above is compliant with an industry standard DDR specification such as a DDR specification published by the Joint Electron Devices Engineering Council (JEDEC).

For ease of illustration, the memory controller logic circuitry, memory chip logic circuitry, buffer logic circuitry and/or RCD logic circuitry that are designed to perform the various MR programming operations and/or act in conformance with the protocols described above have not been depicted in the figures of the instant application. Such circuitry can be implemented with any combination of dedicated hardwired logic circuitry (e.g., a hardwired state machine), some form of programmable logic circuitry (e.g., Field Programmable Gate Array (FPGA) logic circuitry, Programmable Logic Array (PLA) logic circuitry, etc.) and/or some form of logic circuitry that is designed to execute program code such as firmware (e.g., an embedded controller or embedded processor).

FIG. 7 shows a method described above. The method includes receiving an activated chip select signal 701. The method also includes receiving, with the chip select signal being activated, a command code on a command/address (CA) bus that identifies a next portion of an identifier for the memory chip 702. The method also includes receiving the next portion of the identifier on a portion of the memory chip's data inputs 703. Processes 701, 702, 703 are repeated until the entire identifier has been received upon which the entire identifier is stored in a register 704.

FIG. 8 provides an exemplary depiction of a computing system 800 (e.g., a smartphone, a tablet computer, a laptop computer, a desktop computer, a server computer, etc.). As observed in FIG. 8, the basic computing system 800 may include a central processing unit 801 (which may include, e.g., a plurality of general purpose processing cores 815_1 through 815_X) and a main memory controller 817 disposed on a multi-core processor or applications processor, system memory 802, a display 803 (e.g., touchscreen, flat-panel), a local wired point-to-point link (e.g., USB) interface 804, various network I/O functions 805 (such as an Ethernet interface and/or cellular modem subsystem), a wireless local area network (e.g., WiFi) interface 806, a wireless point-to-point link (e.g., Bluetooth) interface 807 and a Global Positioning System interface 808, various sensors 809_1 through 809_Y, one or more cameras 810, a battery 811, a power management control unit 812, a speaker and microphone 813 and an audio coder/decoder 814.

An applications processor or multi-core processor 850 may include one or more general purpose processing cores 815 within its CPU 801, one or more graphical processing units 816, a memory management function 817 (e.g., a memory controller) and an I/O control function 818. The general purpose processing cores 815 typically execute the operating system and application software of the computing system. The graphics processing unit 816 typically executes graphics intensive functions to, e.g., generate graphics information that is presented on the display 803. The memory control function 817 interfaces with the system memory 802 to write/read data to/from system memory 802. The power management control unit 812 generally controls the power consumption of the system 800.

Each of the touchscreen display 803, the communication interfaces 804-807, the GPS interface 808, the sensors 809, the camera(s) 810, and the speaker/microphone codec 813, 814 all can be viewed as various forms of I/O (input and/or output) relative to the overall computing system including, where appropriate, an integrated peripheral device as well (e.g., the one or more cameras 810). Depending on implementation, various ones of these I/O components may be integrated on the applications processor/multi-core processor 850 or may be located off the die or outside the package of the applications processor/multi-core processor 850.

The computing system may also include a memory system, such as system memory (also referred to as main memory) whose memory controller and memory chips (and/or buffer and/or RCD chips) are designed to implement more reliable MR programming protocols such as any of the MR programming protocols described at length above.

Application software, operating system software, device driver software and/or firmware executing on a general purpose CPU core (or other functional block having an instruction execution pipeline to execute program code) of an applications processor or other processor may perform any of the functions described above.

Embodiments of the invention may include various processes as set forth above. The processes may be embodied in machine-executable instructions. The instructions can be used to cause a general-purpose or special-purpose processor to perform certain processes. Alternatively, these processes may be performed by specific hardware components that contain hardwired logic for performing the processes, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A memory controller, comprising:
an interface to couple to a memory channel, wherein, a memory module comprised of multiple memory chips, a registering clock driver chip and at least one data buffer chip is to couple to the memory channel;
logic circuitry to send a program command and an identifier of a particular data buffer chip of the at least one data buffer chip over the memory channel to program the particular data buffer chip with the identifier, the logic circuitry to subsequently send over the memory channel a command that is to be performed by the particular data buffer chip, the logic circuitry to send the identifier over the memory channel with the command to the registering clock driver chip, the registering clock driver chip to then send the command to the particular data buffer chip.

2. The memory controller of claim 1 wherein the memory channel conforms to a Joint Electron Device Engineering Council (JEDEC) dual date rate memory channel specification.

3. The memory controller of claim 2 wherein the program command is a multi-purpose command (MPC).

4. The memory controller of claim 1 wherein the command is to program a termination setting in the particular data buffer chip.

5. The memory controller of claim 1 wherein the command is to program a voltage reference setting in the particular data buffer chip.

6. The memory controller of claim 1 wherein the command is sent prior to training of the memory channel's data bus.

7. The memory controller of claim 1 wherein the command is to program any of:
a timing setting;
an equalization setting;
a drive strength setting.

8. A data buffer chip, comprising:
an interface to couple to a registering clock driver chip;
first register space to store a local identifier;
second register space to store a target identifier;
logic circuitry to receive a program command and the local identifier and write the local identifier into the first register space in response to the program command, the logic circuitry to subsequently:
i) receive a command and the target identifier from the registering clock driver chip and write the target identifier into the second register space;
ii) compare the target identifier and the local identifier; and
iii) perform the command because the target identifier matches the local identifier.

9. The data buffer chip of claim 8 wherein the data buffer chip and registering clock driver chip are components of a memory module that is coupled to a memory channel that conforms to a Joint Electron Device Engineering Council (JEDEC) dual data rate memory channel specification.

10. The data buffer chip of claim 9 wherein the program command is a multi-purpose command (MPC).

11. The data buffer chip of claim 8 wherein the command is to program a termination setting in a memory chip.

12. The data buffer chip of claim 8 wherein the command is to program a voltage reference setting in a memory chip.

13. The data buffer chip of claim 9 wherein the command is sent prior to training of the memory channel's data bus.

14. The data buffer chip of claim 8 wherein the command is to program any of:
a timing setting;
an equalization setting;
a drive strength setting.

15. A computing system, comprising:
a plurality of processing cores;
a network interface;
a memory controller, a memory channel emanating from the memory controller;
a memory module plugged into the memory channel, the memory module comprising a rank of memory chips, a registering clock driver chip and a data buffer chip, the data buffer chip comprising the below:
an interface to couple to the registering clock driver chip;
first register space to store a local identifier;
second register space to store a target identifier;
logic circuitry to receive a program command and the local identifier and write the local identifier into the first register space in response to the program command, the logic circuitry to subsequently:
i) receive a command and the target identifier from the registering clock driver chip and write the target identifier into the second register space;
ii) compare the target identifier and the local identifier; and,
iii) perform the command because the target identifier matches the local identifier.

16. The computing system of claim 15 wherein the memory channel conforms to Joint Electron Device Engineering Council (JEDEC) dual data rate memory channel specification.

17. The computing system of claim 16 wherein the program command is a multi-purpose command (MPC).

18. The computing system of claim 15 wherein the command is to program a termination setting in the data buffer chip.

19. The computing system of claim 15 wherein the command is to program a voltage reference setting in the data buffer chip.

20. The computing system of claim 15 wherein the command is sent prior to training of the memory channel's data bus.

21. A data buffer chip, comprising:
an interface to couple to a registering clock driver chip;
register space to store a local identifier;
logic circuitry to receive a program command and the local identifier and write the local identifier into the register space in response to the program command, the logic circuitry to subsequently:
i) receive a command and a target identifier from the registering clock driver chip;
ii) compare the target identifier and the local identifier; and
iii) perform the command because the target identifier matches the local identifier.

* * * * *